(12) United States Patent
Bachmann et al.

(10) Patent No.: US 9,649,901 B2
(45) Date of Patent: May 16, 2017

(54) AMPHIBIOUS VEHICLE AND METHOD FOR OPERATING AN AMPHIBIOUS VEHICLE

(71) Applicant: KRAUSS-MAFFEI WEGMANN GMBH & CO. KG, Munich (DE)

(72) Inventors: Harald Bachmann, Munich (DE); Thomas Falke, Munich (DE); Gernot Steger, Munich (DE)

(73) Assignee: KRAUSS-MAFFEI WEGMANN GMBH & CO. KG, Munich (DE)

( * ) Notice: Subject to any disclaimer, the term of this patent is extended or adjusted under 35 U.S.C. 154(b) by 0 days.

(21) Appl. No.: 14/889,951

(22) PCT Filed: May 7, 2014

(86) PCT No.: PCT/DE2014/100160
§ 371 (c)(1),
(2) Date: Nov. 9, 2015

(87) PCT Pub. No.: WO2014/180470
PCT Pub. Date: Nov. 13, 2014

(65) Prior Publication Data
US 2016/0082797 A1 Mar. 24, 2016

(30) Foreign Application Priority Data
May 10, 2013 (DE) .......... 10 2013 104 833

(51) Int. Cl.
*B60F 3/00* (2006.01)
*F41H 7/04* (2006.01)
(Continued)

(52) U.S. Cl.
CPC .......... *B60F 3/0007* (2013.01); *B60F 3/0015* (2013.01); *B62D 55/06* (2013.01); *B63H 11/02* (2013.01); *F41H 7/042* (2013.01)

(58) Field of Classification Search
CPC .......... B60F 3/00; B60F 3/0061; B60F 3/003; F41H 7/04; F41H 7/042; F41H 7/02; F41H 7/044; B63H 11/01
See application file for complete search history.

(56) References Cited

U.S. PATENT DOCUMENTS

| 2,406,290 | A |   | 8/1946  | Hait   |           |
|-----------|---|---|---------|--------|-----------|
| 2,432,857 | A | * | 12/1947 | Briggs | B63H 5/16 |
|           |   |   |         |        | 114/148   |

(Continued)

FOREIGN PATENT DOCUMENTS

| DE | 2 006 943  | 9/1971 |
| DE | 280 075    | 6/1990 |
| DE | 197 48 561 | 7/1998 |

OTHER PUBLICATIONS

PCT, International Search Report, Int'l Appln. No. PCT/DE2014/100160 (mailed Aug. 8, 2014, published Nov. 13, 2014).

*Primary Examiner* — Andrew Polay
(74) *Attorney, Agent, or Firm* — Thompson Hine LLP

(57) ABSTRACT

An amphibious vehicle (1), which may be a military amphibious vehicle, having a hull (2) which accommodates the crew of the vehicle, and a flow duct (10) extending through the hull (2) and having a water jet drive (12) arranged therein for driving the vehicle (1) on water, wherein at least one end (11) of the flow duct (10) can be closed off by an anti-mine element (14) when the vehicle is travelling on land. A method for operating an amphibious vehicle (1), which may be a military amphibious vehicle, having a hull (2) which accommodates the crew of the vehicle, a flow duct (10) which extends through the hull (2), and a water jet drive (12) arranged therein for driving the vehicle (1) on water, includes closing off at least one end (11) of the flow duct (10) by an anti-mine element (14) when the vehicle is travelling on land.

13 Claims, 7 Drawing Sheets

(51) Int. Cl.
*B62D 55/06* (2006.01)
*B63H 11/02* (2006.01)

(56) References Cited

U.S. PATENT DOCUMENTS

| | | | |
|---|---|---|---|
| 2,758,561 | A | 8/1956 | Cigledy |
| 3,420,204 | A * | 1/1969 | Samuel ................... B63H 11/11 440/12.56 |
| 4,921,605 | A | 5/1990 | Chastan-Bagnis et al. |
| 5,839,927 | A | 11/1998 | Thomas et al. |
| 6,808,430 | B1 | 10/2004 | March |
| 2007/0017360 | A1 * | 1/2007 | Cohen ..................... F41H 5/023 89/36.08 |

* cited by examiner

AMPHIBIOUS VEHICLE AND METHOD FOR OPERATING AN AMPHIBIOUS VEHICLE

TECHNICAL FIELD

The disclosure relates to an amphibious vehicles, for example military amphibious vehicles, of a type having a hull that accommodates the vehicle crew, and a flow duct which is guided through the hull, having a water jet drive, which is arranged therein, for driving the amphibious vehicle during travel on water. The disclosure furthermore relates to a method for operating an amphibious vehicle, in particular a military amphibious vehicle, of a type having a hull that accommodates the vehicle crew, and a flow duct which is guided through the hull, having a water jet drive, which is arranged therein, for driving the amphibious vehicle during travel on water.

BACKGROUND

Both the civil sector and the military sector have long used amphibious vehicles of differing design which are distinguished in particular by means of the drives thereof. This is because, due to the greatly differing operating conditions during travel on land and on water, separate drives have to be provided for travel on land and travel on water, for which purpose various driving concepts have been developed in the past.

In the case of amphibious vehicles, use is made, as the land power unit, of the wheel or chain drives known from the land vehicle sector, with chain-driven amphibious vehicles frequently being encountered in particular in the military sector. Said chain-driven amphibious vehicles customarily have a chain running gear and a closed hull composed of armored steel, in which the vehicle crew is accommodated in a manner protected against military threats.

For travel on water, amphibious vehicles are equipped with a separate drive which ensures the necessary propulsion during the floating mode. As water power unit, use can be made of various drives known from the watercraft sector. For example, use can be made of drives which are arranged on the outside of the vehicle and which are arranged in the manner of an outboard motor with an exposed propeller in the rear region thereof and are supplied with power from the interior of the amphibious vehicle. What are referred to as water jet drives or jet drives have also proven successful as water power units. In these drives, the propeller is arranged within a flow duct and is used for accelerating a water jet, via the repelling force of which the required propulsion is produced. In contrast to the drives arranged externally, said drives are generally arranged internally, as a result of which said drives are better protected against mechanical damage, in particular also during travel on land. The power supply in the case of these drives also turns out to be less complicated because of the internal arrangement of the propeller since a shorter and therefore also lighter drive train can be realized as a result.

In the case of military amphibious vehicles which have a protected hull for accommodating the vehicle crew, the arrangement of such water jet drives in the interior of the vehicle has proven problematic, however, because of the flow duct guided through the hull. This is because the inflow and outflow openings provided at the end of the flow duct pass through the hull, which is designed to be protected against military threats, and therefore said hull is weakened and there is an increased risk of injury to the individuals accommodated within the hull. For example, the clouds of gas which are released during an explosion of a mine and are frequently also referred to as a blast can penetrate the interior of the flow duct with very great energy and can result there in considerable damage including even complete tearing off of the flow duct. In the worst case, the clouds of gas can also penetrate the protected interior of the vehicle, which means a considerable potential of danger to the crew.

SUMMARY

Against this background, this disclosure is directed to an amphibious vehicle and also a method for operating an amphibious vehicle, which amphibious vehicle and method are distinguished by a simple construction of the water drive with simultaneously good protection of the vehicle crew against military threats.

In an embodiment, an advantage of the disclosed amphibious vehicle is that at least one end of the flow duct is designed to be closable via an anti-mine element during travel on land.

By closing the one end of the flow duct via an anti-mine element, the safety of the crew can be significantly increased during use of an internal water jet drive. This is because, by closing the end of the flow duct via the anti-mine element, the flow duct is shielded from possible military threats and, in particular, penetration of warfare agents, splinters, pressure waves, mine blast and the like is prevented. During travel on water, the flow duct can be opened, thus resulting in an amphibious vehicle which is equally distinguished by an internal water drive with a simple drive train and also a high degree of safety for the vehicle crew.

According to an advantageous refinement, both ends of the flow duct are designed to be closable via anti-mine elements during travel on land, and therefore both ends of the flow duct are shielded against military threats. By this means, the protection of the amphibious vehicle during travel on land can be decisively improved.

The hull of the amphibious vehicle can be formed from armored steel in order to protect the vehicle crew in particular against ballistic threats. The anti-mine element is preferably also formed from armored steel, as a result of which good protection against ballistic threats is also produced to this extent in the region of the end of the flow duct.

According to a structural refinement, the anti-mine element is of plate-like design, thus resulting in a closure possibility of compact construction for the end of the flow duct.

It has proven advantageous if the anti-mine element is movable to and fro between an anti-mine position and a throughflow position. In the anti-mine position, the anti-mine element can close the end of the flow duct during travel on land. In the throughflow position, the end of the flow duct can be released for the throughflow of water. By moving the anti-mine element, it is optionally possible to change between the anti-mine position and the throughflow position depending on whether the amphibious vehicle is moving on land or in water.

A frame for supporting the anti-mine element during action of a mine is preferably provided. The frame forms a secure support of the anti-mine element such that the latter, even under the influence of a mine detonation, cannot push inward into the vehicle interior and cause injuries there to the vehicle occupants.

The end of the flow duct is particularly preferably surrounded by the frame, and therefore the frame completely surrounds the end of the flow duct. The flow duct is therefore also shielded, for example, from mine detonations via the anti-mine element supported on the frame.

In a preferred refinement, the frame has a flange surface for connection to the flow duct. The flow duct can be directly connected to the frame via the flange surface.

It has proven advantageous if a seal for sealing off the frame from the anti-mine element is provided. Via the seal, the flow duct can be shielded from dust and similar particles during travel on land. However, a sealing action can be produced via the seal not only in the anti-mine position. Also during travel on water, the seal can produce a sealing action between the anti-mine element and a pocket of the amphibious vehicle, into which the anti-mine element enters during travel on water such that water cannot penetrate therein.

According to a further refinement, a driving device is provided for moving the anti-mine element. Via the driving device, the anti-mine element can be moved to and fro between the anti-mine position and the throughflow position. It is therefore not required to move the anti-mine element manually. The driving device can be designed, for example, as a spindle drive.

In this connection, a refinement has proven successful in which, in addition to the driving device, an electronic control unit is provided for controlling the movements of the anti-mine element. The electronic control unit can control the movement of the anti-mine element with reference to inputs by the vehicle crew undertaken via operating elements. Alternatively or additionally, the movement can be controlled via sensors which detect the transition from travel on land to travel on water.

The amphibious vehicle is preferably provided with a monitoring device for detecting the position of the anti-mine element and producing a warning signal in the event of misalignment of the anti-mine element. The monitoring device can determine the position of the anti-mine element. The determined position can be compared with a predetermined desired position and a warning signal can be produced if the determined position differs from the desired position. It is thereby possible to prevent an inadvertent leaving of the end of the flow duct open during travel on land from remaining undetected. In such a case, the anti-mine element can be moved, optionally by hand, in front of the end of the flow duct in order to increase the level of protection in the region of the end of the flow duct. In the same manner, it can be detected if the anti-mine element is unintentionally closing the flow duct during travel on water. In the event of such a misalignment, the anti-mine element can be moved away, optionally by hand, out of the region of the end of the flow duct.

For the drive during travel on water, it is advantageous if the flow duct runs from the lower side of the hull to the rear of the hull. The water can be sucked up from the lower side of the hull and ejected in the rear region of the amphibious vehicle, which rear region points to the rear during travel on water. Since the risk of a mine explosion in vehicles is generally greatest in the region of the floor or body, the anti-mine element is preferably arranged on the lower side of the hull or in the body region of the hull.

In the case of a method of the type mentioned at the beginning, the object is achieved in that at least one end of the flow duct is closed via an anti-mine element during travel on land.

The same advantages are afforded as have already been described in conjunction with the amphibious vehicle according to the invention.

According to an advantageous refinement of the method, the closing of the end of the flow duct via the anti-mine element takes place automatically. This affords the advantage that the end of the flow duct does not have to be closed manually.

It is advantageous if a sensor produces a signal for closure as soon as it is detected that the amphibious vehicle is on land. Via the sensor, either the automatic closing of the flow duct can be initiated, or the vehicle crew can be given a warning indication that the closing of the flow duct has to be initiated, optionally manually. The sensor can be designed as a water sensor, in particular as an opto-electronic, electrical or mechanical water sensor, or can interrogate the shift states of the transmission.

The advantageous features described with regard to the amphibious vehicle according to the invention can be used by themselves or also in combination with the method according to the invention.

BRIEF DESCRIPTION OF THE DRAWINGS

Further advantages and details of the amphibious vehicle and of the method for operating an amphibious vehicle will be explained below with reference to an exemplary embodiment illustrated in the drawings, in which.

DETAILED DESCRIPTION

Figure 1:
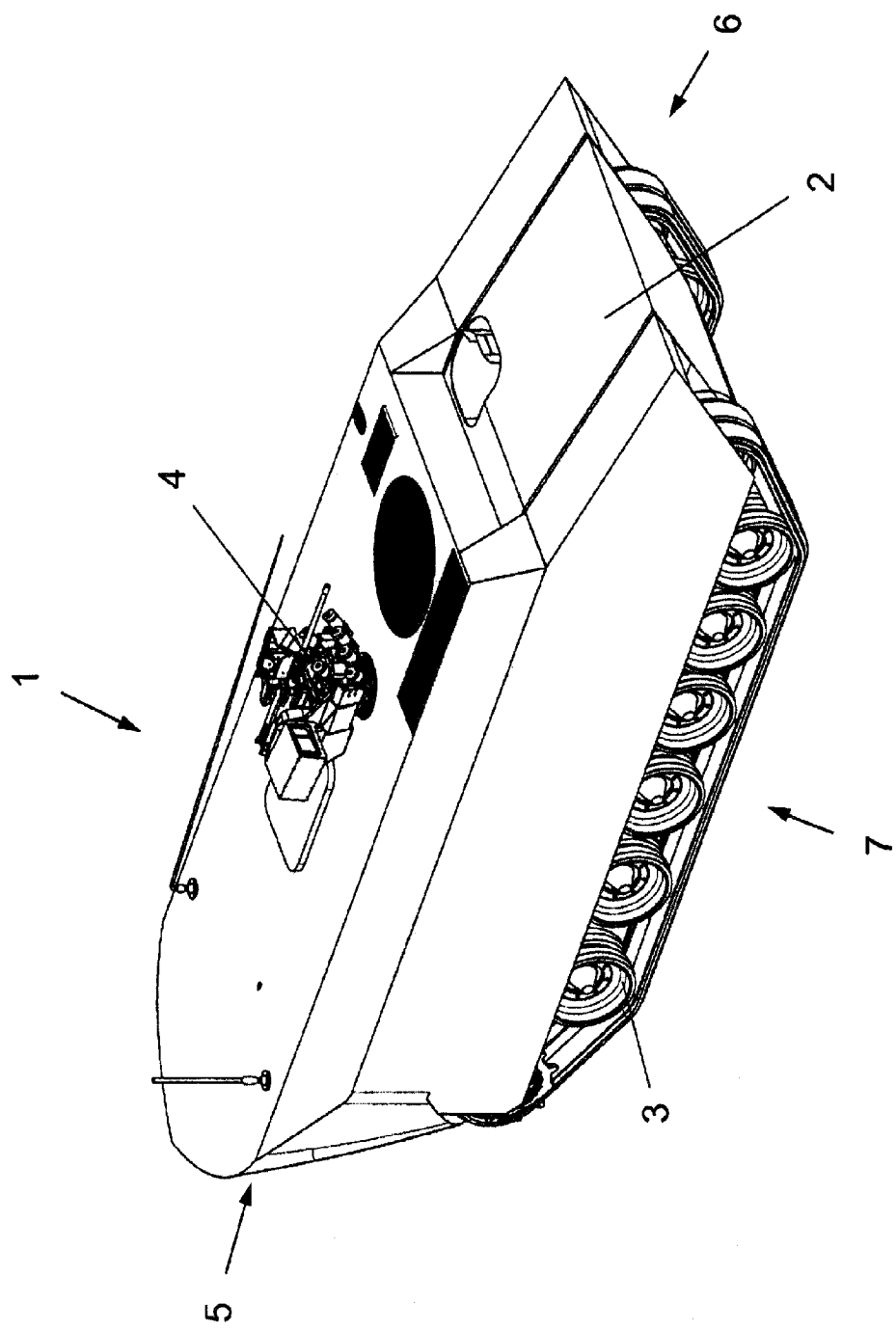
FIG. 1 shows a perspective view of a military amphibious vehicle.

FIG. 1 shows an amphibious vehicle 1, which may take the form of a military amphibious vehicle, that is used equally both for travel on land and in water.

The amphibious vehicle 1 is designed in the manner of a floatable tank and has an armored hull 2 for accommodating the vehicle crew, and a chain running gear 3, via which the amphibious vehicle 1 is driven on land. The chain running gear 3 forms the land power unit of the amphibious vehicle 1, wherein the present invention is not limited to chain-driven amphibious vehicles 1 but can equally also be used in the case of wheel-driven amphibious vehicles 1.

The amphibious vehicle 1 has a special characteristic which results from the fact that the main directions of travel of the amphibious vehicle 1 for travel on land and on water are opposed. During the transition between travel on land and on water, the main direction of travel of the amphibious vehicle 1 is rotated. By this means, for example, the vehicle rear pointing to the rear during travel on land forms the front 5 of the amphibious vehicle during travel on water. Terms such as "front", "rear", "at the front", "at the rear", etc. are therefore in each case used below within the context of travel on water.

The hull 2 is composed of armored steel and has a prow-like front 5 in the front region to improve the floating properties. The rear 6 arranged in the rear region of the hull 2 has a stepped shape. Since the rear 6 forms the front of the vehicle 1 during travel on land, better ground visibility arises from said stepped shape. A weapon 4 which can be oriented in azimuth and elevation and which can be operated by remote control from the interior of the hull 2 is arranged above the hull 2.

In addition to the chain running gear 3 serving as the land power unit, the amphibious vehicle 1 has a water jet drive 12 for travel on water, which is arranged within the protected hull 2. As can be gathered from the illustration in FIG. 2, the water jet drive 12 is arranged within a flow duct 10 which runs from the lower side 7 of the hull 2 to the rear 6 of the hull 2. A first end 11 of the flow duct 10 is located on the lower side 7. Water from below the amphibious vehicle 1 is sucked up by the water jet drive 12 via the first end 11 and conducted through the flow duct 10 in the direction of the water jet drive 12.

Figure 2:
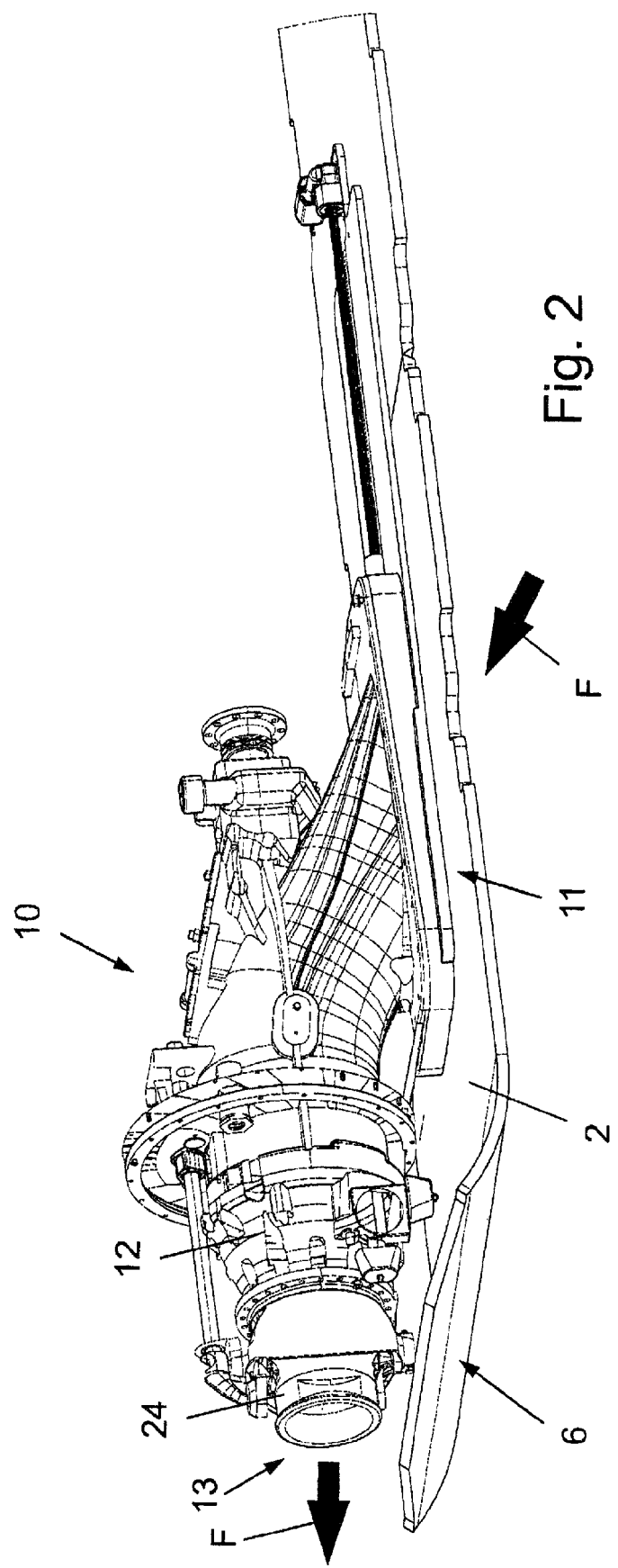
FIG. 2 shows a perspective view of an enlarged detail from the hull of the amphibious vehicle according to the illustration in FIG. 1.

The water jet drive 12 has an impeller, i.e. a propeller arranged in the flow duct 10, and operates in the manner of a pump. Water is sucked up by the water jet drive 12 via the first end 11, conveyed in the direction of the second end 13 and ejected there as a driving jet from the flow duct 10. The second end 13 is arranged at the rear 6 of the hull 2. In FIG. 2, the throughflow direction F of the flow duct 10 is indicated by two arrows.

Owing to the arrangement of the flow duct 10 within the hull 2, a simple construction of the drive train is produced, the water jet drive 12 can be supplied in a simple manner with power and is readily protected from mechanical damage. However, with regard to the level of protection of the hull 2 against threats due to bullets and mines, the internal arrangement of the flow duct 10 has proven disadvantageous since the ends 11, 13 of the flow duct 10 form openings which are accessible from the outside in the hull 2, which is designed to be protected. In order therefore better to protect the vehicle crew located in the hull 2, the first end 11 of the flow duct 10 is designed to be closable via an anti-mine element 14, which will be discussed in detail below.

The anti-mine element 14 serves to close the flow duct 10 on the end side during travel on land and therefore to prevent pressure waves arising in the event of a mine being triggered from being able to penetrate the flow duct 10. Damage to the hull 2 caused by action of a mine can thereby be reduced and endangerment of the crew eliminated.

The second end 13 of the flow duct 10 can also be designed so as to be closable via a corresponding anti-mine element 14, as a result of which the protection of the amphibious vehicle 1 can be increased once again. For example, closure of the second anti-mine element 14 makes it possible to prevent any attackers from causing hand grenades or the like to detonate in the flow duct. In addition, protection against shelling is also achieved via the protection element.

Further details of the anti-mine element 14 will be explained below with reference to FIGS. 3 to 7.

In FIGS. 3 to 7, the first end 11 of the flow duct 10, via which the water is sucked up from below the vehicle, is designed to be closable via the anti-mine element 14. In a similar manner, a corresponding anti-mine element 14 could also be arranged at the second end 13 of the flow duct 10.

Figure 3:
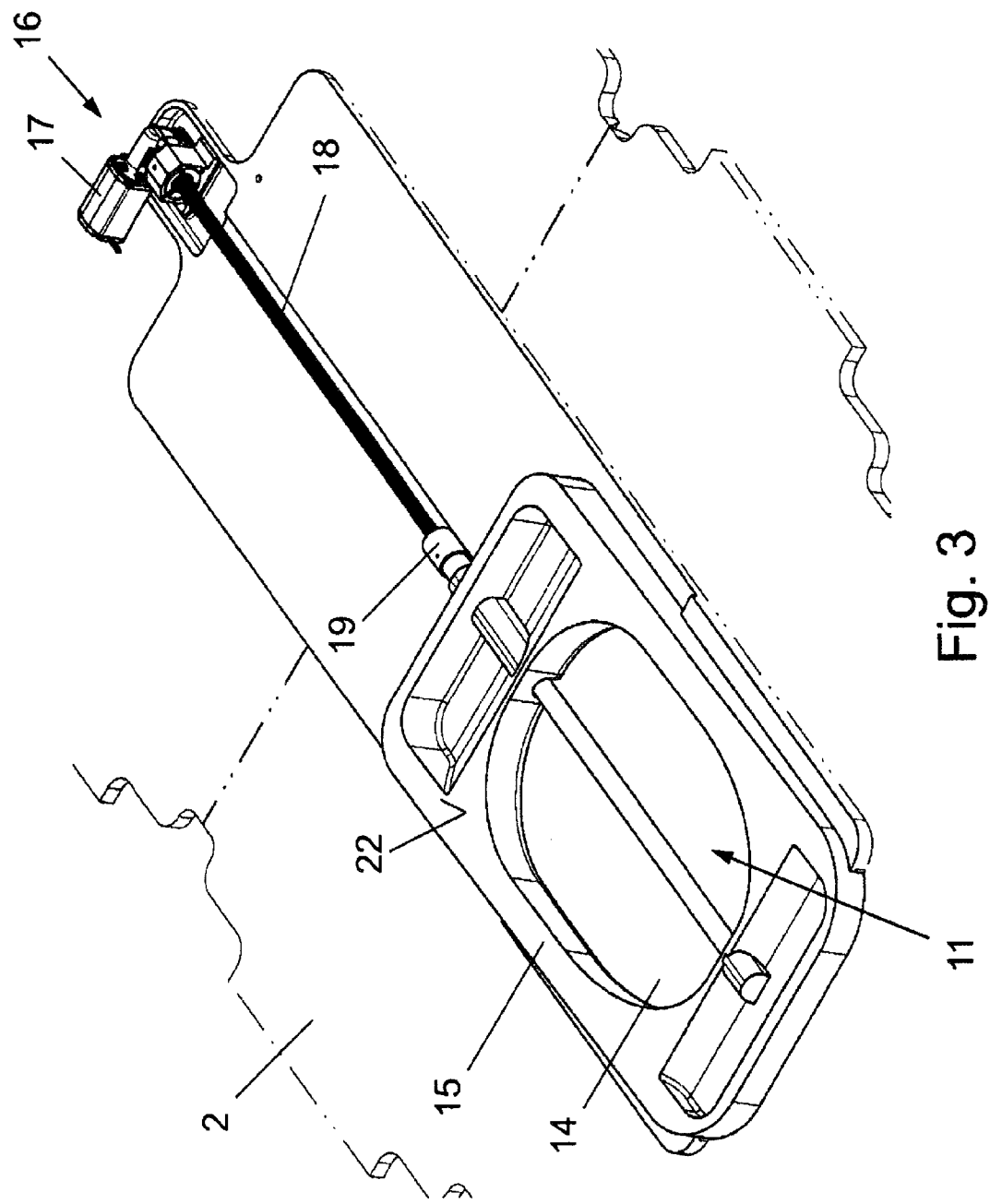
FIG. 3 shows a perspective view of one end of the flow duct with an anti-mine element in the anti-mine position.
Figure 7:
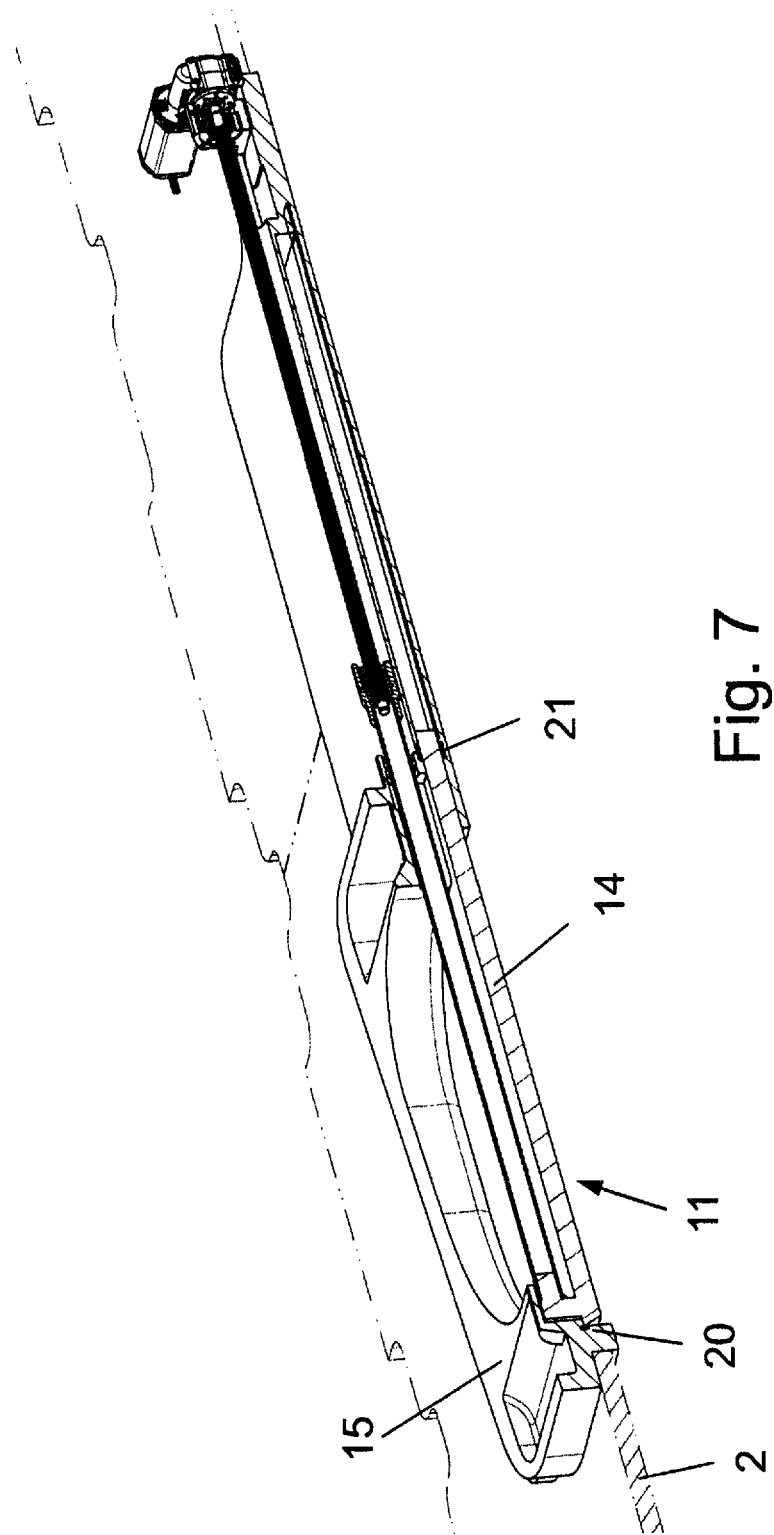
FIG. 7 shows a perspective illustration of the end of the flow duct, in which the anti-mine element is in the anti-mine position.

As can be gathered from the illustration in FIGS. 3 and 7, the anti-mine element 14 is overall of plate-like geometry. The anti-mine element 14 is composed of armored steel and can be moved to and fro between the anti-mine position shown in FIGS. 3 and 7 and the throughflow position shown in FIGS. 4 and 6. The movement of the anti-mine element 14 takes place in a translatory manner and on a direct path. Alternatively, the anti-mine element could be moved in a rotatary manner, for example by rotating a disc-shaped anti-mine element which closes the end 11 of the flow duct 10 in the manner of a panel.

A frame 15 which is welded on the inside to the hull 2 is provided for supporting the anti-mine element 14 during action of a mine. The frame 15 completely surrounds the first end 11 of the flow duct 10. A flange surface 22 on which the flow duct 10 is flange-mounted is arranged on the frame 15. A groove 23 in which the anti-mine element 14 is guided in an axially movable manner is furthermore let into the frame 15. In order to seal against dust, seals 20, 21 composed of a rubber material are arranged on the frame 15 and are used to seal off the frame 15 from the anti-mine element 14 in the anti-mine position, cf. FIG. 7.

In order to move the anti-mine element 14, the amphibious vehicle 1 is provided with a driving device 16 which is supplied with power electrically via the on-board electronics of the amphibious vehicle 1 and which has a motor 16, a threaded spindle 18 driven by the motor and a spindle nut 19 which is connected to the anti-mine element 14 and sits on the threaded spindle. The driving device 16 and therefore the movement of the anti-mine element 14 are controlled via an electronic control unit, which is not illustrated in the figures.

Likewise not illustrated in the figures is a monitoring device via which the position of the anti-mine element 14 can be detected and a warning signal can be produced in the event of misalignment of the anti-mine element 14. This will also be discussed in the description below of the method according to the invention.

Figure 4:
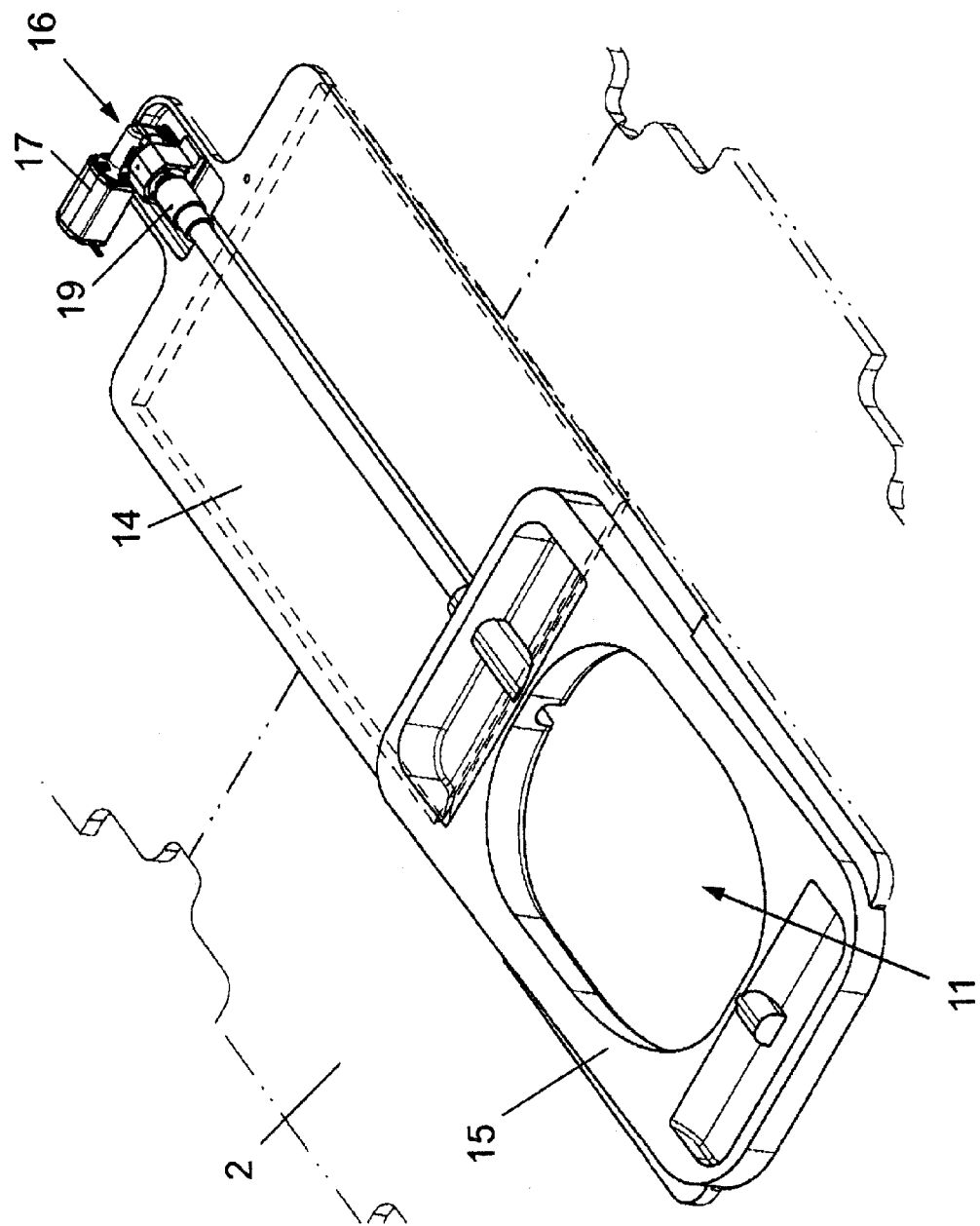
FIG. 4 shows a perspective view of one end of the flow duct with an anti-mine element in the throughflow position.

According to the illustration in FIG. 4, the anti-mine element 14 is in the throughflow position in which water can enter the flow duct 10 via the oval end 11 thereof. The anti-mine element 14 is brought into this position during travel on water, and therefore the amphibious vehicle 1 can be driven via the water jet drive 11. In this respect, the flow duct 10 is open during travel on water and is not closed, not even partially, by the anti-mine element 14. During the travel on water, the amphibious vehicle 1 is propelled via the repelling forces of the ejected water jet, wherein the amphibious vehicle 1 is steered during travel on water by alignment of a movable nozzle 24 which is arranged at the second end 13 of the flow duct and directs the ejected water jet in a corresponding direction. If the amphibious vehicle 1 has a plurality of water jet drives 12, the amphibious vehicle can also be steered volumetrically. In this case, different throughflow rates in the water jet drives are used in order to maneuver the vehicle.

During landing of the amphibious vehicle 1, it is automatically detected via a sensor of the amphibious vehicle 1 that the amphibious vehicle 1 is on land and is no longer in the water. The sensor can be designed, for example, as a water sensor. The sensor produces a signal for closing the flow duct 10, which signal is forwarded to the electronic control unit of the amphibious vehicle 1. The electronic control unit thereupon initiates the closing operation of the anti-mine element 14. The driving device 16 is activated here in such a manner that it moves the anti-mine element 14 from the throughflow position in the direction of the anti-mine position 14.

The signal of the sensor can optionally be forwarded to a monitoring device which, in the manner of a function check, checks whether the end 11 of the flow duct 10 is closed during travel on land. If the end 11 of the flow duct 10 is not closed during travel on land, a warning signal can be produced. By means of the warning signal, the vehicle crew can be warned that the flow duct 10 is not closed and thus the level of protection is reduced. The vehicle crew can then bring the anti-mine element 14, optionally manually, into the anti-mine position. Even during travel on water, the monitoring device can detect and indicate misalignment of the anti-mine element 14. If the end 11 of the flow duct 10 is closed during travel on water, a warning signal can be produced and it is therefore indicated to the vehicle crew that the flow duct 10 is undesirably blocked. The vehicle crew can then remove the anti-mine element 14, optionally manually, from the end 11 of the flow duct 10.

Figure 5:
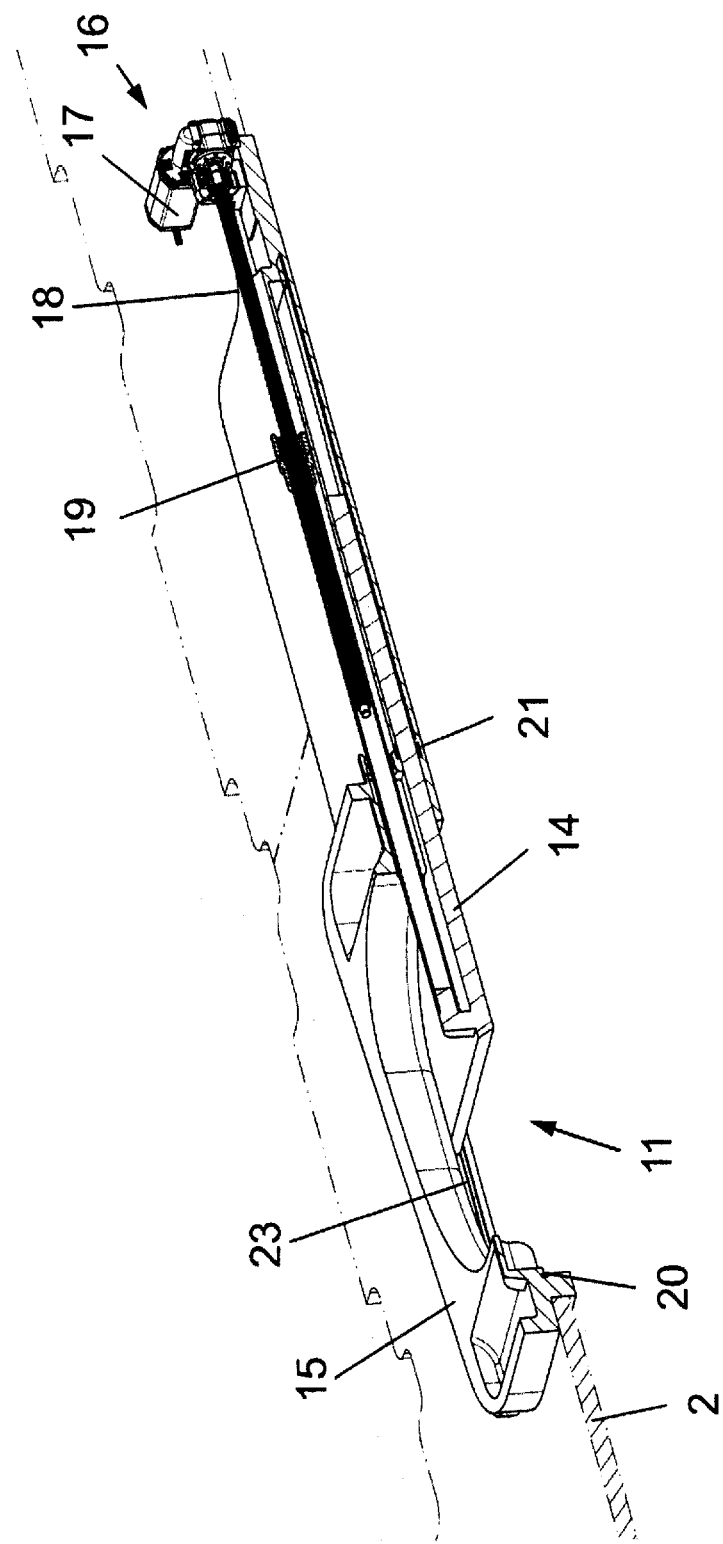
FIG. 5 shows a perspective sectional illustration of the end of the flow duct, in which the anti-mine element is in an intermediate position.
Figure 6:
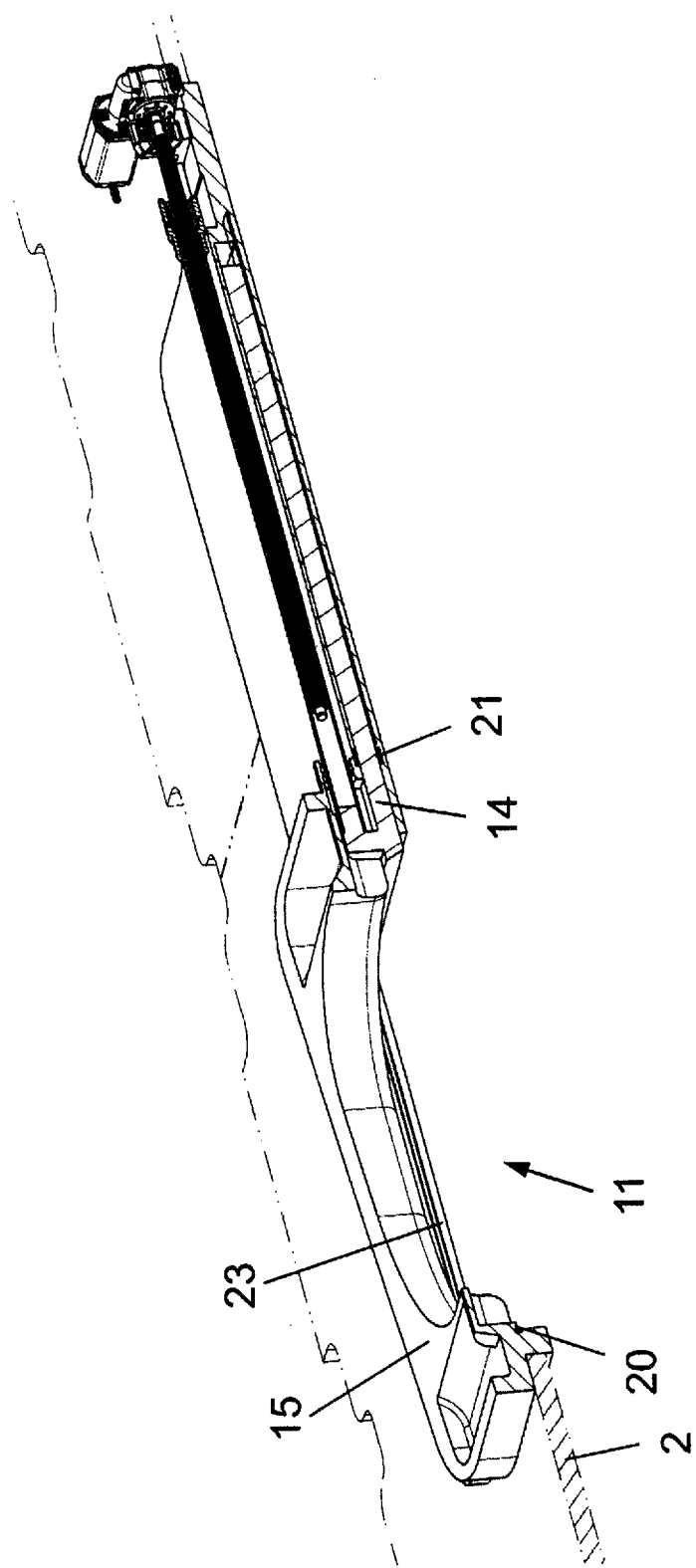
FIG. 6 shows a perspective sectional illustration of the end of the flow duct, in which the anti-mine element is in the throughflow position.

An intermediate position of the anti-mine element 14 during the movement from the throughflow position into the anti-mine position is illustrated in FIG. 5.

Finally, the anti-mine element reaches the anti-mine position which is shown in FIG. 7 and in which the armored anti-mine element 14 closes the first end 11 of the flow duct 10 in a sealing manner. During travel on land, the flow duct 10 is not necessary for driving the amphibious vehicle 1 and can lie dry. The protection of the amphibious vehicle 1 during travel on land can therefore be improved by closing the flow duct 10 via the anti-mine element. The level of protection in the region of the end 11 of the flow duct 10 is therefore higher during travel on land than during travel on water.

If the amphibious vehicle 1 transfers again from travel on land to travel on water, the above-described method steps are executed in a reverse sequence.

The above-described military amphibious vehicle 1 comprising a hull 2 which accommodates the vehicle crew has a flow duct 10 which is guided through the hull and has a water jet drive 12, which is arranged therein, for driving the amphibious vehicle 1 during travel on water, and an end 11 which is designed to be closable via an anti-mine element 14 during travel on land such that the protection of the amphibious vehicle 1 is significantly improved during travel on land.

| Reference symbols: | |
| --- | --- |
| 1 | Military amphibious vehicle |
| 2 | Hull |
| 3 | Chain running gear |
| 4 | Weapon |
| 5 | Front (during travel on water) |
| 6 | Rear (during travel on water) |
| 7 | Lower side |
| 10 | Flow duct |
| 11 | Suction-side end of the flow duct |
| 12 | Water jet drive |
| 13 | Ejection-side end of the flow duct |
| 14 | Anti-mine element |
| 15 | Frame |
| 16 | Driving device |
| 17 | Motor |
| 18 | Threaded spindle |
| 19 | Spindle nut |
| 20 | Seal |
| 21 | Seal |
| 22 | Flange surface |
| 23 | Groove |
| 24 | Movable nozzle |
| F | Throughflow direction |

What is claimed is:

1. An amphibious vehicle, the vehicle comprising:
   a hull (2) which accommodates the vehicle crew;
   a flow duct (10) which is guided through the hull (2) and which runs from a lower side of the hull to a rear of the hull, the flow duct having a first end located on the lower side and a second end at the rear of the hull;
   a water jet drive (12) arranged within the flow duct downstream of the first end and upstream of the second end for driving the amphibious vehicle (1) during travel on water, the water jet drive oriented to suck water up via the first end, and eject the water from the second end as a driving jet;
   a first plate-shaped anti-mine element (14) for closing the first end of the flow duct and a second plate-shaped anti-mine element (14) for closing the second end of the flow duct; and
   wherein both the first end and the second end (11, 13) of the flow duct (10) are closable via the first and the second plate-shaped anti-mine elements (14) during travel on land.

2. The amphibious vehicle as claimed in claim 1, further comprising a second driving device for moving the second anti-mine element, the second driving device including a motor, a threaded spindle driven by the motor, and a spindle nut connected to the anti-mine element that sits on the threaded spindle.

3. The amphibious vehicle as claimed in claim 1, wherein the anti-mine element (14) is movable between an anti-mine position and a throughflow position.

4. The amphibious vehicle as claimed in claim 1, further comprising a first frame (15) for supporting the anti-mine element (14) during action of a mine, the first frame being connected to the hull at the first end and including a groove that guides the first anti-mine element in an axially movable manner when the first driving device moves the first anti-mine element.

5. The amphibious vehicle as claimed in claim 4, wherein the first end of the flow duct (10) is surrounded by the first frame (15).

6. The amphibious vehicle as claimed in claim 4, wherein the first frame (15) has a flange surface (22) for connection to the flow duct (10).

7. The amphibious vehicle as claimed in claim 4, further comprising a seal (20, 21) for sealing off the first frame (15) from the first anti-mine element (14).

8. The amphibious vehicle of claim 1, wherein the vehicle is a military amphibious vehicle.

9. A method for operating an amphibious vehicle (1), the method comprising:
   providing a hull (2) that accommodates a crew of the vehicle, a flow duct (10) that is guided through the hull (2) and which runs from a lower side of the hull to a rear of the hull, the flow duct having a first end located on the lower side and a second end at the rear of the hull, a water jet drive (12) arranged within the flow duct downstream of the first end and upstream of the second end, for driving the amphibious vehicle (1) during travel on water, the water jet drive oriented to suck water up via the first end, and eject the water from the second end as a driving jet, a first plate-shaped anti-mine element (14) for closing the first end of the flow duct and a second plate-shaped anti-mine element (14) for closing the second end of the flow duct; and
   selectively closing the first end and the second end of the flow duct during travel on land with the first and the second plate-shaped anti-mine elements, respectively.

10. The method as claimed in claim 9, wherein the amphibious vehicle (1) is designed as claimed in claim 1.

11. The method of claim 9, wherein the vehicle is a military amphibious vehicle.

12. The method of claim 9, wherein the first end and the second end are each selectively closed with the first and the second plate-shaped anti-mine elements moved by first and second driving devices, the first and second driving devices each including a motor, a threaded spindle driven by the motor, and a spindle nut connected to the respective anti-mine element that sits on the threaded spindle.

13. An amphibious vehicle, the vehicle comprising:
   a hull (2) which accommodates the vehicle crew;
   a flow duct (10) which is guided through the hull (2) and which runs from a lower side of the hull to a rear of the hull, the flow duct having a first end located on the lower side and a second end at the rear of the hull;
   a water jet drive (12) arranged within the flow duct downstream of the first end and upstream of the second end for driving the amphibious vehicle (1) during travel on water, the water jet drive oriented to suck water up via the first end, and eject the water from the second end as a driving jet;
   a first plate-shaped anti-mine element (14) for closing the first end of the flow duct; and
   a first driving device for moving the first anti-mine element, the first driving device including a motor, a threaded spindle driven by the motor, and a spindle nut connected to the anti-mine element that sits on the threaded spindle.

* * * * *